Aug. 7, 1956  R. E. BOYDEN ET AL  2,757,862
READ-OUT APPARATUS FOR AN IMPULSE ACTUATED ACCUMULATING DEVICE
Filed March 15, 1954  6 Sheets-Sheet 1

INVENTORS,
Robert E. Boyden, William F. Collison,
Kenneth F. Oldenburg & Fred N. Schwend

*Fred N. Schwend*
ATTORNEY.

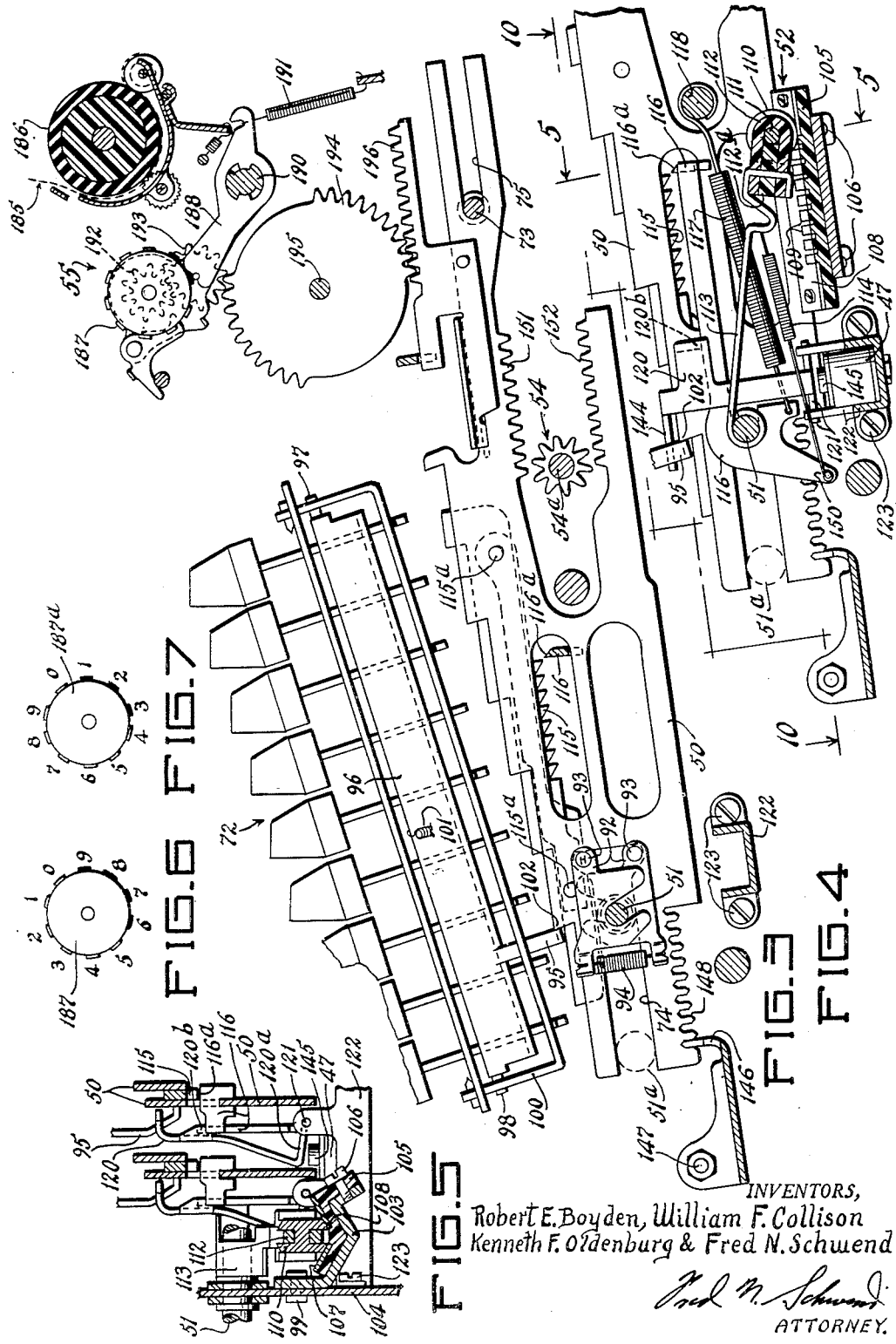

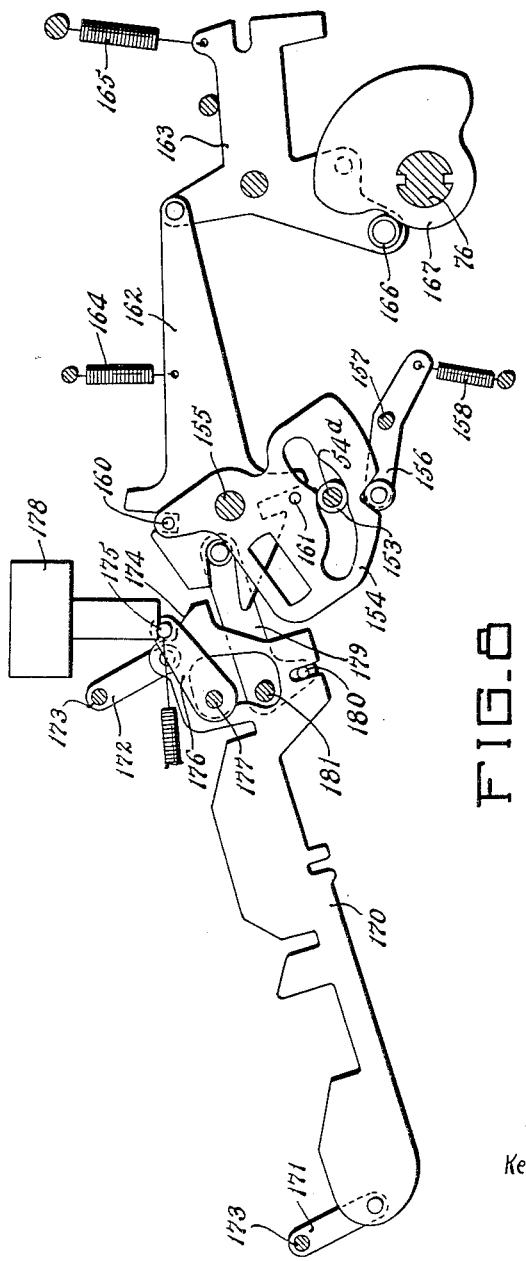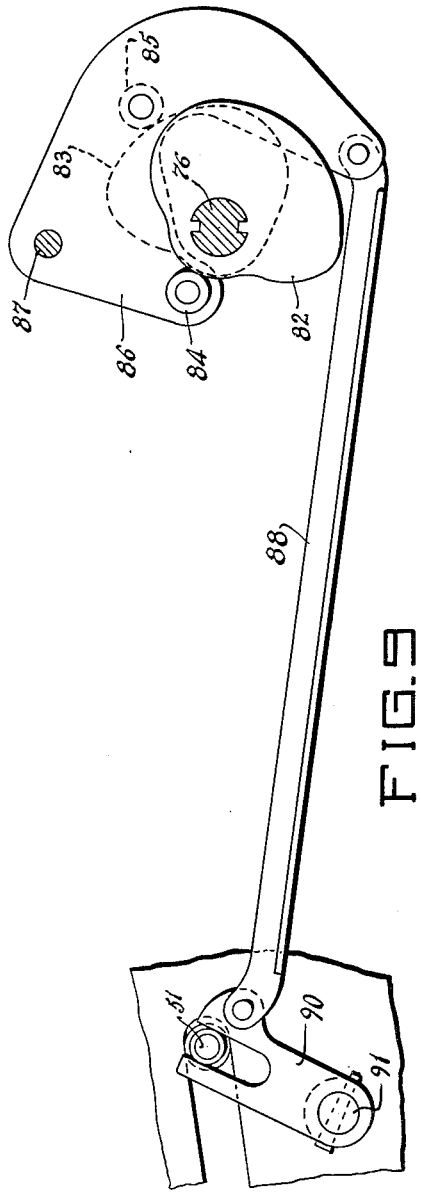

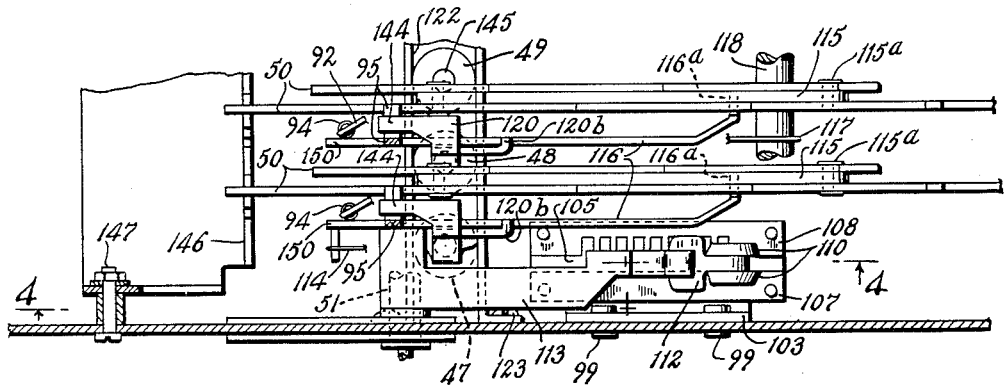
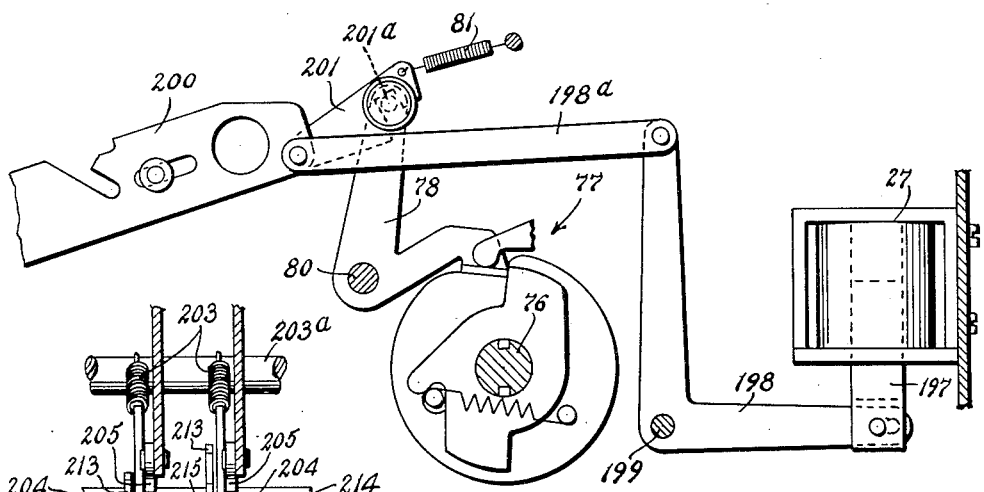
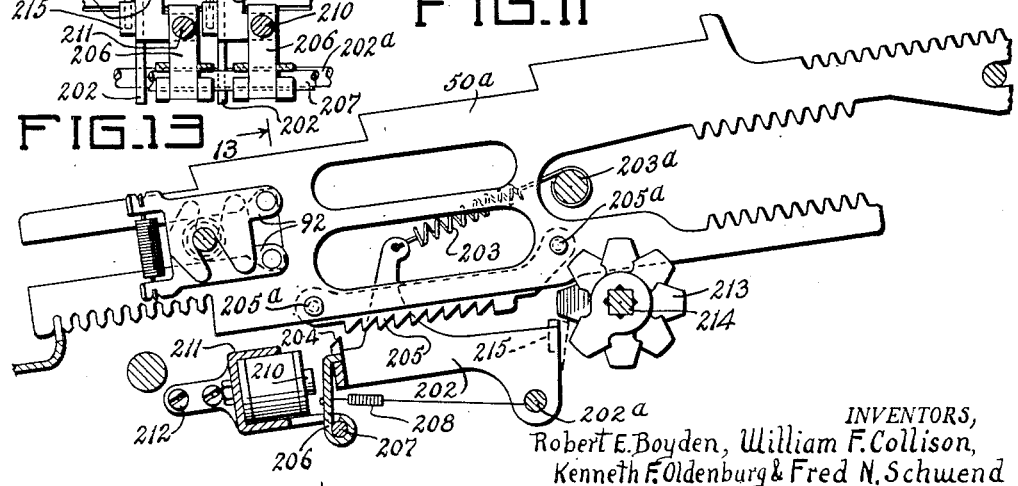

Aug. 7, 1956  R. E. BOYDEN ET AL  2,757,862
READ-OUT APPARATUS FOR AN IMPULSE ACTUATED ACCUMULATING DEVICE
Filed March 15, 1954  6 Sheets-Sheet 5

INVENTORS,
Robert E. Boyden, William F. Collison,
Kenneth F. Oldenburg & Fred N. Schwend

*Fred N. Schwend*
ATTORNEY.

Aug. 7, 1956 — R. E. BOYDEN ET AL — 2,757,862
READ-OUT APPARATUS FOR AN IMPULSE ACTUATED ACCUMULATING DEVICE
Filed March 15, 1954 — 6 Sheets-Sheet 6

INVENTORS,
Robert E. Boyden, William F. Collison,
Kenneth F. Oldenburg & Fred N. Schwend

ATTORNEY.

United States Patent Office 2,757,862
Patented Aug. 7, 1956

2,757,862

READ-OUT APPARATUS FOR AN IMPULSE ACTUATED ACCUMULATING DEVICE

Robert E. Boyden, San Gabriel, William F. Collison, Pasadena, Kenneth F. Oldenburg, Los Angeles, and Fred N. Schwend, El Monte, Calif., assignors to Clary Corporation, a corporation of California Application March 15, 1954, Serial No. 416,140

16 Claims. (Cl. 235—60.4)

This invention relates to read-out systems for digital computing equipment.

Generally speaking, equipment of this nature, particularly of the electronic type, embody electronic counters, storage registers, or accumulators for counting pulses or writing digits or for registering factors or results of a calculation.

Such pulse counters or accumulators often register in either a straight decimal or coded decimal fashion and require read-out mechanism embodying visual indicating devices or printing devices for presenting the data in an intelligible form.

In the case of counters or accumulators operating in a coded decimal fashion, special decimal conversion circuits of mechanisms must be provided to enable the data to be registered in a decimal manner which is universally understandable.

A principal object of the present invention is to provide economical and novel read-out systems applicable to either straight decimal, coded decimal, or non-decimal type counters or accumulators without requiring elaborate or expensive decimal conversion mechanisms, in order to read out in decimal form.

Another object is to provide a simple read-out system for a pulse or impulse actuated counter or accumulator.

Another object is to provide a read-out system for a pulse or impulse actuated accumulating device in which a minimum number of wire leads are required between a read-out device and the accumulating device or storage register.

Another object is to provide such a read-out system in which the speed of read out is determined primarily by the read-out device capabilities and is not seriously limited by the conversion or transfer system from the accumulator or register to the read-out device.

The manner in which the above and other objects are accomplished will be readily understood on reference to the following specification when read in conjunction with the accompanying drawings, wherein:

Fig. 3 is a longitudinal sectional view through a mechanical read-out machine embodying a mechanical accumulator and printing instrumentalities comprising part of the read-out system.

Fig. 4 is a longitudinal sectional view, with parts broken away, illustrating the rack clutching device and pulse emitter, this view being taken substantially along the line 4—4 of Fig. 10.

Fig. 5 is a transverse sectional view taken along the line 5—5 of Fig. 4.

Fig. 6 is a side view of one of the printer dials illustrating the progression of numeral type therearound.

Fig. 7 is a side view of a printer dial according to the modified form of the invention shown in Figs. 12 and 13, illustrating the progression of numeral type therearound.

Fig. 8 is a side view illustrating the accumulator controls.

Fig. 9 is a side view illustrating the rack device mechanism.

Fig. 10 is a sectional plan view taken substantially along the line 10—10 of Fig. 4.

Fig. 11 is a side view illustrating the cyclic clutch of the machine and the controls therefor.

Fig. 12 is a longitudinal sectional view illustrating a modified form of read-out machine.

Fig. 13 is a transverse sectional view taken along the line 13—13 of Fig. 12.

Figure 1:
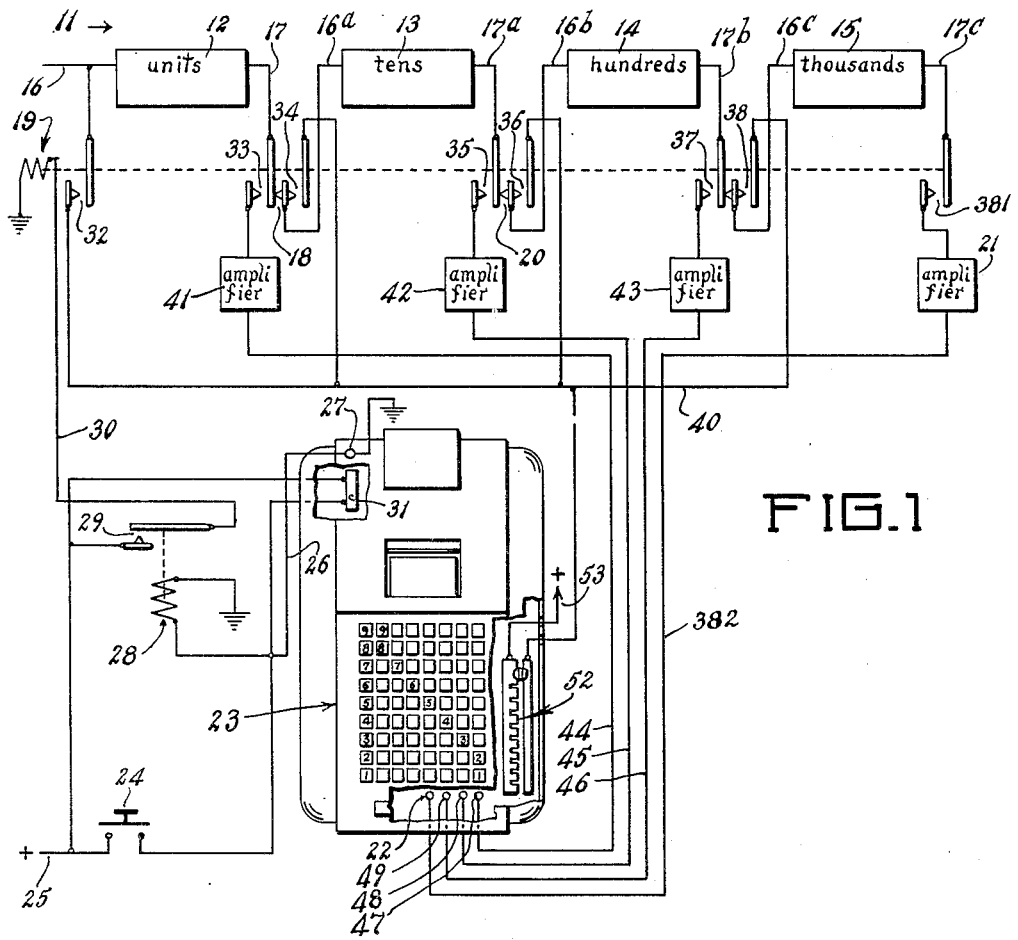
Fig. 1 is a schematic view of a combined pulse actuated electronic counter and a read-out system embodying a preferred form of the present invention.
Figure 2:
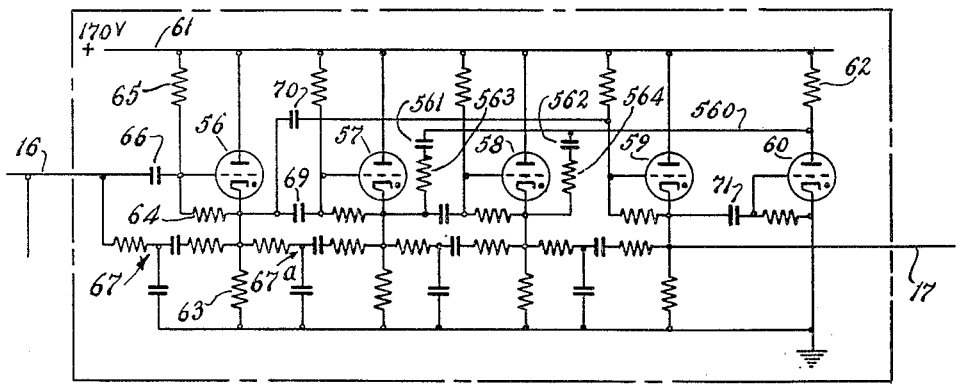
Fig. 2 is a circuit view of a binary coded decimal decade chosen for illustration in connection with the present invention.
Figure 14:
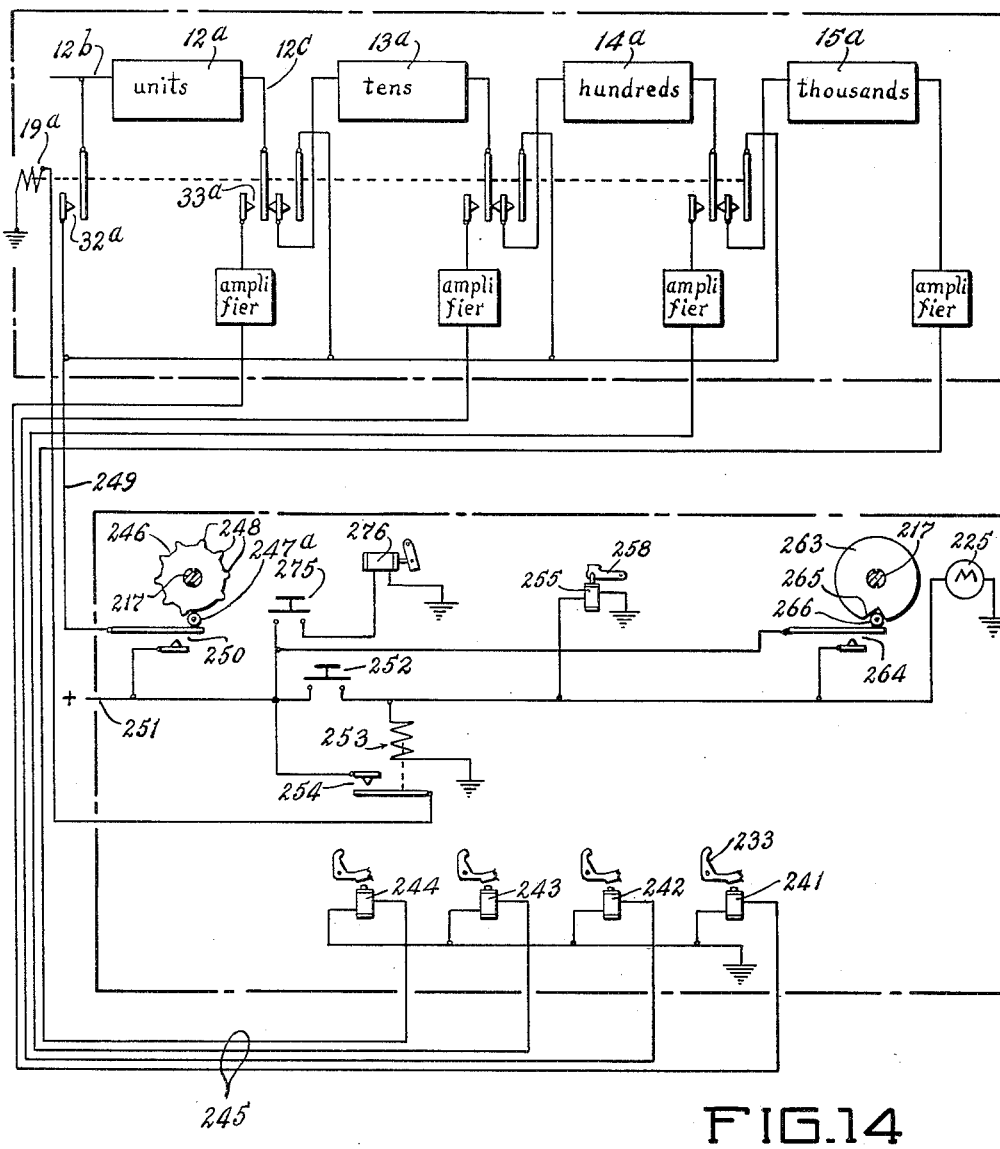
Fig. 14 is a schematic view of a modified form of read-out system embodying the present invention and utilizing a visual indicating device.
Figure 15:
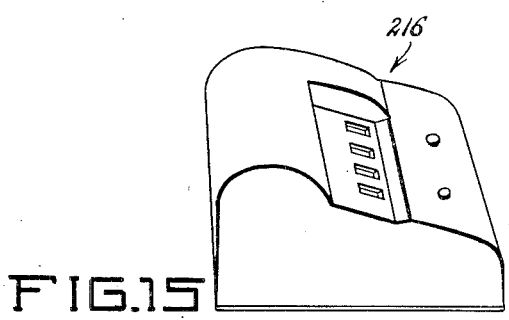
Fig. 15 is a perspective view of the visual indicating device.
Figures 16, 17:
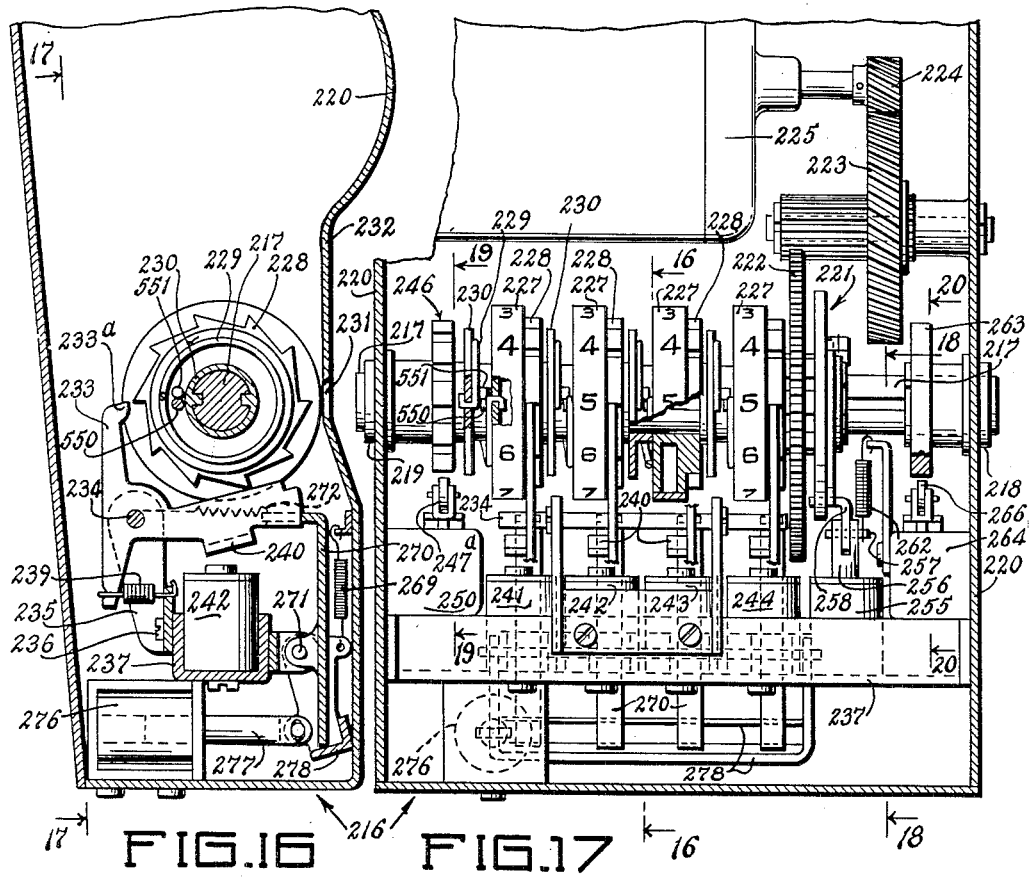
Fig. 16 is a longitudinal sectional view through the indicating device of Fig. 15 and is taken along the line 16—16 of Fig. 17.
Fig. 17 is a bottom plan view of the indicating device and is taken along the line 17—17 of Fig. 16.
Figure 18:
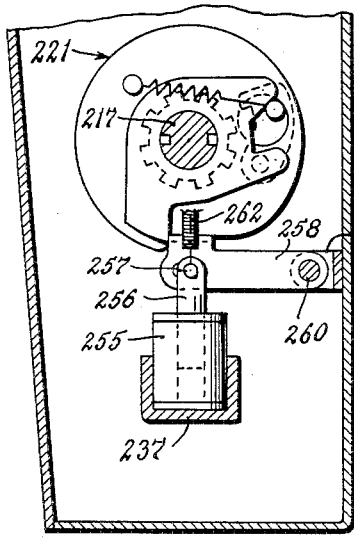
Fig. 18 is a sectional view illustrating the cyclic clutch and controls therefor, and is taken along the line 18—18 of Fig. 17.
Figures 19, 20:
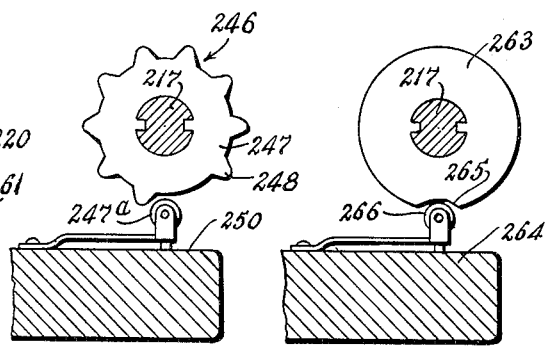
Fig. 19 is a sectional view illustrating the pulse-emitter and is taken along the line 19—19 of Fig. 17.
Fig. 20 is a sectional view taken along the line 20—20 of Fig. 17 illustrating the circuit holding device.

Referring in particular to the embodiment illustrated in Figs. 1 to 6, and 8 to 11, the read-out system shown therein is illustrated as associated with an electronic counter of the binary coded decimal type generally indicated at 11. The counter comprises four binary type counting decades 12, 13, 14 and 15. The input circuit 16 of the units counter decade 12 is connected to a suitable source (not shown) of pulses to be counted. The output or overcarry circuit 17 of the units decade is connected to the imput circuit 16a of the tens decade 13 through normally closed contacts 18 of a normally de-energized relay 19. Likewise, the output circuit 17a of the tens decade is connected through normally closed contacts 20 of the relay 19 to the input circuit 16b of the hundreds decade, etc.

The output circuit 17c of the thousands decade 15 is connected through normally open contacts 381 of the relay 19 and an amplifier circuit 21 to a solenoid generally indicated at 22 operatively associated with a differential actuator located in the thousands denominational order of a printing type read-out machine generally indicated at 23.

The pulses received over the input circuit 16 are registered by the units decade 12 and every tenth pulse is transferred via the contacts 18 to the tens decade 13, etc.

The machine 23 is cyclic in nature and whenever it is desired to read out and record an amount registered in the counter 11, a swtich 24 is momentarily closed, completing a circuit from a source of potential 25, through a line 26 to a control solenoid 27 which is effective, as will be described in detail hereinafter, to cause operation of the machine. Simultaneously, a circuit will be completed through the winding of a relay 28, closing contacts 29 thereof which, through line 30 completes a circuit from the source 25, through the energizing coil of relay 19 to ground.

A normally open machine actuated switch 31 is connected in a shunt across the contacts of switch 24 and is held closed during a cycle of operation of the machine whereby to maintain the relays 28 and 19 energized throughout such cycle.

The relay 19, upon being energized closes normally open contacts 32 to 38, inclusive, and 381 thus connecting the input circuits of the various counter decades 12 to 15 to a pulse line 40 and connecting the output circuits of the counter decades 12, 13, 14, and 15 through amplifier circuits 41, 42, 43, and 21 and lines 44, 45, 46, and 382 to electromagnets generally indicated at 47, 48, 49, and 22, respectively. The latter are located in the machine 23 and are operatively associated with the units, tens, hundreds, and thousands order actuator racks, respectively, in the machine 23.

As will be described in detail hereinafter, the various actuator racks 50 (Fig. 3) in the machine 23 are normally retained in their home or zero registration positions and are adapted to be driven forwardly, i. e., to the left in Fig. 3 by a transversely extending rack drive shaft 51. The latter is advanced forwardly from its full-line position to its dotted-line position 51a during a machine cycle, the extent of this movement being effective to drive the various racks possibly nine increments from their zero positions to their nine's positions.

The shaft 51 invariably advances nine increments during each cycle. At certain times in such cycle, i. e., when the respective control magnets, such as 22 and 47, are energized, the associated rack will be coupled through a clutching mechanism to be described hereinafter, to the rack drive shaft 51 and will thus advance therewith until the shaft reaches its final dotted-line position.

Also associated with the rack-drive shaft 51 and generally indicated at 52 (Figs. 1 and 4) is a pulse emitter adapted to supply pulses from a source of positive potential 53 (Fig. 1) to the aforementioned pulse line 40, one pulse being emitted during each incremental advance of the rack-drive shaft 51 between one digital position to the next. However, when relay 19 is first energized as an incident to closing of the switch 24 to effect a read-out operation a pulse is initially applied over the various input lines 16, 16a, 16b, and 16c, through their now closed respective contacts 32, 34, 36, and 38 from this source 53 via the pulse emitter 52 to thus enter a count pulse into each of the decades 12, 13, and 14 and 15 before the rack drive shaft commences its travel.

As the rack drive shaft 51 advances from one incremental position to the next, the pulse emitter will transmit an additional pulse through the line 40 to the input circuits of the various counter decades. When the count in any decade reaches 10 an overcarry pulse will be transmitted over its respective output circuit, such as 17 through the respective relay contacts, such as 33, and amplifier, such as 41, to the associated rack control magnet, such as 47, to permit coupling of the associated rack 50 to the rack drive shaft 51, enabling the latter to drive the rack through the remainder of the nine increments of movement traversed by the latter shaft.

The racks 50 are associated with an accumulator generally indicated at 54 (Fig. 2) and a printer generally indicated at 55, whereby the racks may differentially set the printer to print the value previously registered in the counter and digitize the accumulator to accumulate such value. For example, if the various decades of the counter 11 register the value "149," a read-out operation initiated by closing the switch 24 will initially effect entry of a pulse into all of the counter decades so that the latter at this point would register the value "250." Accordingly, the units order control magnet 47 of the machine will be energized, coupling the units rack 50 to the drive shaft 51. Therefore, the units rack will eventually be advanced to nine increments to enter the value "9" into the units order of the accumulator 54 and to set the units order printer element of the printer 55 to a "9" printing position.

After five increments of advance of the rack drive shaft the tens decade 13 of the counter will have received five pulses in addition to the initial pulse, thereby effecting transmission of an overcarry pulse over the output circuit 17a and consequently energization of the control magnet 48, causing the rack in the tens order of the machine to be coupled to the drive shaft 51. Thus, this rack will be advanced through the remainder of four increments of movement to register the digit "4" in the accumulator and printer.

Since the hundreds order counter decade initially registered the value "2" before the rack drive shaft commenced movement, this shaft will advance eight increments before its associated control magnet 49 will be energized coupling the respective rack to the drive shaft for the remaining one increment of movement, thus registering the value "1" on the respective printer and accumulator elements.

Since a total of ten pulses are entered into the input circuits of each of the decades during a read-out operation, the various decades will be returned to their original digit registering position. The operation in effect comprising a sub-totalling function. However, suitable means (not shown), well-known in the art, may be provided to reset the counter decades to zero registration, as an incident to such read-out operation. During return of the racks the pulse emitter may be rendered ineffective to enter pulses into the counter as by disconnecting the source 53, or resetting of the counter may occur after return of the racks.

*Counter decades*

As noted hereinabove the read-out system of the present invention may be used to read-out information from any type of decimal or coded decimal electronic counter or accumulator or any base number. However, the counter chosen for the purpose of the present illustration herein is of the binary coded decimal type, one decade of which is illustrated schematically in detail in Fig. 2. The counter decade comprises five gaseous, cold cathode type vacuum tubes 56 to 60, inclusive. The first four tubes 56 to 59 constitutes the actual counting tubes capable of counting in the binary or radix-two system, whereby the tube stages represent the decimal values of 1, 2, 4 and 8, respectively. Tube 60 comprises a reset tube effective to reset the decade to zero when ten pulses have been registered.

All of the above tubes are preferably of the type commercially known as No. 5823 and are so arranged that when the counter is in zero condition all four counter tubes 56 to 59 are in a stage of conduction while the reset tube 60 is in non-conductive state.

For this purpose, the cathode of each of the tubes 56 to 59 is connected to ground through a register, like resistor 63, of 33,000 ohms while the anodes are directly connected to a plus 170-volts supply line 61. The cathode of the reset tube 60, on the other hand, is connected directly to ground while its anode is connected to the supply line through a resistor 62 of 150,000 ohms.

A 470,000 ohms resistor, like resistor 64, is placed in the cathode-igniter circuit of each of the tubes and co-operates with a 1 meg ohm resistor, like resistor 65, to normally positively bias the ignitors of tubes 56 to 59 to a point slightly below the firing potential level of these tubes.

Pulses to be counted are preferably of an amplitude of approximately 130-volts and of 500-micro-second duration and are transmitted simultaneously through a coupling capacitor 66 to the igniter of the first counter tube 56 and through an R. C. delay circuit generally indicated at 67 to the cathode of this tube. By virtue of this delay circuit the above noted count pulse is first applied to the igniter of the tube 56 and shortly thereafter to the cathode thereof.

Assuming the counter circuit to be in a zero condition, application of the first count pulse to conductor 16 will have no effect on the igniter of tube 56 since the latter tube is currently in a state of conduction. Shortly thereafter, however, the same pulse transmitted through delay circuit 67 will raise the potential of the cathode of this tube sufficiently to extinguish the tube. This will leave the counter decade unit in a condition representing the binary term "0001."

Application of the second count pulse to the conductor 16 will be transferred through capacitor 66, now causing ignition of the tube and as the voltage drop across the tube decreases, a positive pulse will be applied across capacitor 69 to the igniter of tube 57. Since this tube is currently conducting, no change will be effective but as the pulse is eventually transmitted by the delay circuit 67a associated with the tube 57, the cathode of the latter will be raised sufficiently to extinguish the tube, leaving the counter unit in a condition representing the binary term "0010." Although, a positive pulse will also be transmitted at this time through a capacitor 70 to the igniter of the last counter tube 59, it will have no effect on the latter tube since it is already in conducting condition.

Application of the third count pulse to the input circuit 16 will again render the counting tube 56 non-conductive. The fourth pulse will cause ignition of tube 56 in which case both counter tubes 56 and 57 will become conductive and tube 58 will be extinguished. This sequence of events will continue throughout the registration of pulses up to "9" at which time tubes 56 and 59 will be rendered non-conducting causing the counter to assume the binary "1001" condition.

The tenth count pulse will render the first counting tube 56 conducting and the consequent increase in potential of its cathode will be applied as a pulse substantially simultaneously through the delay circuit 67a to the cathode of the second counting tube 57 and also through the capacitor 70 to the igniter of the fourth, now non-conducting, counter tube 59, causing the latter to ignite. The consequent increase in potential of the cathode of tube 59 will be transmitted through capacitor 71 to fire the reset tube 60.

The consequent drop in potential in the anode circuit of tube 60 will be transmitted along line 560 and through pairs of series connected capacitors 561 and 562 and resistors 563 and 564 to the cathodes of tubes 57 and 58, thus preventing the latter from being rendered non-conductive, as by a pulse generated by extinguishing tube 56. Thus, all counting tubes 56 to 59 will be left in non-conducting condition, registering the binary "0000" condition.

As the positive potential is removed from the igniter of the tube 60, the latter returns to its non-conductive state due to the voltage drop across the load resistor 62, and the rise in potential of the cathode of tube 59 occuring as an incident to the registration of the tenth pulse, will also cause a positive carryover or tens count pulse to be applied to the output circuit 17.

*Read-out machine*

The read-out machine generally indicated at 23 (Fig. 1) and illustrated in certain of its details in Figs. 3, 4, 5, 6, 8, 9, 10 and 11, is based on the well-known Clary Adding Machine. The latter is disclosed and claimed in the patent to R. E. Boyden No. 2,583,810, issued on January 29, 1952. The particular accumulating mechanism employed in this machine is disclosed and claimed in the patent to E. P. Drake, No. 2,472,696, issued on June 7, 1949.

Since the basic structure of the machine is disclosed in the above noted patents and is found in the commercially available Clary Adding Machine only those portions which relate to or form part of the present invention will be disclosed herein in detail.

Reference is therefore had to said patents for a disclosure of the complete machine, including mechanisms not specifically disclosed herein. However, it is to be understood that the invention is not limited to the particular machine disclosed.

The machine includes a series of banks or orders of amount keys 72 on which amounts may be manually entered into the machine if desired. Each order also includes one of the aforementioned racks 50, located directly below the respective bank of amount keys.

The racks 50 are guided for fore and aft movement by the aforementioned shaft 51 and a stationary shaft 73 embraced by guide slots 74 and 75, respectively, in each rack.

Referring to Fig. 11, the machine is driven by a suitable motor (not shown) through a cyclic clutch, generally indicated at 77, the driven side of which is connected to a rotatable drive shaft 76.

The clutch is controlled by a clutch dog 78, pivoted at 80, and normally urged by a spring 81 into its illustrated position where it maintains the clutch in a disengaged position.

Counterclockwise rocking of the clutch dog will enable engagement of the clutch to drive the shaft 76 through a complete revolution.

Keyed on shaft 76 is a pair of complementary rack drive cams 82 and 83 (Fig. 9) engaged by rollers 84 and 85, respectively, carried by a cam follower 86 fulcrumed at 87 and connected by link 88 to a bifurcated arm 90. The latter embraces one end of the rack drive shaft 51 and is fastened to a rockable shaft 91 journalled in the frame of the machine. A second arm (not shown) similar to arm 90 is also secured to the shaft 91 and has a bifurcation embracing the opposite end of the shaft 51 to cause a parallel movement thereof through nine increments of movement between the limits indicated in Fig. 3.

Means are provided for enabling the drive shaft 51 to yieldably advance the various racks 50 through nine increments of travel. For this purpose each rack is yieldably connected to the shaft 51 by a pair of opposed driving pawls 92, rockably mounted on the shaft 51 and provided with rollers 93 engageable in lateral depressions formed at the closed end of the rack slots 74. A spring 94 urges the pawls 92 to normally hold the rollers 93 in the depressions in the rack slot 74, until the respective rack is arrested. Such driving means is effective only during a totalling operation of the machine or when the machine is operated to enter amounts set up in the amount keys 72.

A zero block 95 is provided in each order of the machine to normally maintain the respective rack 50 in its illustrated home position. The block 95 is carried by a lock bail 96 pivotally supported on trunnion bearing 97 and 98 located in a keyboard frame 100. A spring 101 normally holds the lock bail in a location to position the block 95 in front of a shoulder 102 formed on the rack 50. Means (not shown) are provided to rock each bail 96 to remove block 95 from engagement with the shoulder 102 of the respective rack upon depression of an amount key in the respective order or upon a totalling operation.

*Pulse emitter*

According to the present invention, the aforementioned pulse emitter 52 is operatively connected to the rack drive mechanism for the purpose of applying one pulse during each incremental advance of the latter. The pulse emitter comprises a channel element 103 (Figs. 4 and 5) suitably attached to a side frame 104 of the machine as by rivets 99. An insulating piece 105 is secured to the channel piece by screws 106 and carries on its upper face two strips 107 and 108 of metal. These strips are separated from each other and the strip 108 is notched or serrated as indicated at 109 (Fig. 4), the notches being filled in with tooth-like portions of the insulating piece 105.

A double conical metal wheel 110 is arranged to roll longitudinally in contact with both strips 107 and 108 whereby to intermittently complete circuit connections across the strips. The wheel 110 is split, having a short axle section 111 journalled in a U-shaped bearing member 112 of insulation material. An arm 113 pivotally mounted at one end on the drive shaft 51, is fastened at its opposite end to the bearing member 112 and to a filler piece 112a. The arm is urged downwardly to maintain the wheel 110 in intimate contact with the strips 107 and 108 by a spring 114 extending between the arm and the tail 150 of an adjacent coupling pawl 116 to be described presently.

Rack clutching device

As mentioned heretofore during a read-out operation of the machine, the racks 50 are coupled to the rack drive shaft 51 at certain times during forward advance of the latter depending upon the amounts registered in the associated counter decades. For this purpose, a toothed bar 115 is attached to each rack 50 by rivets 115a. The teeth of the bar 115 are arranged to be engaged by a finger 116a formed on the pawl 116. The latter is pivotally mounted on the shaft 51 and is urged upwardly by a light spring 117 tensioned between a depending lug of the pawl and a stationary cross rod 118.

The pawl in each order, is normally held in its position shown in Figs. 4 and 5 wherein it is ineffective to engage the teeth of rack bar 115 by a latch 120. The latter has oppositely extending pivot arms 121 pivotally mounted in bearings formed in channel member 122. This member is rigidly secured to the machine frame, one of which is indicated at 104, by screws 123. A forward extension 144 on the upper end of the latch 120 extends directly behind the associated zero block 95 which is effective to normally hold a latch 120 in latching position.

The latch 120 is formed as shown in Fig. 5 with a portion 120a comprising an armature located directly above the core 145 of the associated rack-control magnet, like magnet 47.

During operation of the machine and whenever a pulse emitted by the emitter 52 fills the respective decade, i. e., 12, the magnet, i. e., 47 will be energized to rock the latch 120 counterclockwise (as viewed in Fig. 5), rocking zero block 95 from blocking relation with its associated rack 50 and moving its latching nose 120b to release the pawl 116. The pawl will then rock upward to engage the vertical shoulder of the particular tooth in the bar 115 to which it is adjacent at the time. Pawl 116 will accordingly be effective to drive the rack along with the drive shaft 51 until the latter reaches the end of its nine increments of travel.

The various racks 50 are held in home positions as shown in Fig. 3 and in advanced positions to which they have been driven by the pawls 116 by a lock bail 146 fulcrumed on frame pins 147 and actuated before and after forward advance of the rack drive shaft 51 by suitable means (not shown) so as to engage between two combining teeth 148 located on each rack. After the rack drive shaft 51 has advanced to its forward dotted line position along with the drive pawls 116, the bail will be rocked upwardly, thereby engaging the tails 150 of the advanced pawls 116 to rock the latter clockwise to their illustrated unclutched positions, permitting the zero blocks 95 to force the respective latches 120 into latching engagement with the pawls.

During return of the shaft 51, the pawls 92 will engage the rear ends of the slots 74 to return the racks to their home positions, whereupon the lock bail 146 will again engage the combing teeth as illustrated.

Accumulator positioning controls

The accumulator 54 (Fig. 3) is raised or lowered to mesh the accumulator gears with upper or lower gear sections 151 and 152, respectively, of the various racks depending on the type of operation to be performed. During normal read-out or add operations, the accumulator is raised to mesh with the rack sections 151 whereas during totalling operations the accumulator is lowered to mesh with the rack sections 152.

Referring to Fig. 8, the accumulator shaft 54a of the accumulator is provided with rollers on the opposite ends thereof, one which is shown at 153 embraced by a cam slot formed in a box cam 154. The latter is pivoted on a frame stud 155. The cam 154 is normally held in its illustrated neutral position by a centralizer 156, pivoted at 157 and urged clockwise by a spring 158 to normally engage a centralizing notch formed on the under edge of the box cam, thus maintaining the accumulator in its illustrated neutral position.

The cam 154 carries a pair of pins 160 and 161 located on opposite sides of its pivot pin 155 and adapted to be selectively engaged by a double hook member 162. This member is pivotally connected to a three armed cam follower 163. The hook member is normally held in its upper illustrated position by a tension spring 164, extending between a frame pin and the hook member so as to embrace the upper pin 162 of the box cam.

The cam follower 163 is urged counter-clockwise by a tension spring 165 extending between the cam follower and a suitable frame pin to maintain a roller 166 thereon against the periphery of a cam 167 keyed on the drive shaft 76. The cam 167 has a high portion extending substantially half way about its periphery whereby to rock the cam follower 163 and consequently the cam 154 to clockwise rocked positions where they are held during the first half of a machine cycle, i. e., during the forward movement of the rack drive shaft 51 until the latter reaches its dotted line position 51a.

Since the hook member 162 is normally held in its raised position shown it will normally be effective to rock the cam 154 clockwise to engage the accumulator with the upper rack sections 151 to affect the additive entries into the accumulator.

Means are provided for lowering the hook number in response to initiation of a totalling operation of the machine. For this purpose, a control bar 170 is provided, being supported for longitudinal movement by parallel links 171 and 172 pivotally supported by frame pins 173. The control bar 170 has a camming surface 174 underlying a pin 175 carried on an arm 176 fulcrumed at 177. The pin 175 underlies the stem of a depressible total bar 178.

The control bar 170 is connected by a pin and slot connection 180 to a bell crank 179 pivotally supported at 181 and connected through to a second pin and slot connection 182 to the hook member 162. Thus, upon depression of the total bar, the control bar 170 will be advanced, rocking the bell crank 179 to lower the hook member against the action of spring 164 causing it to embrace the pin 161 on the cam. During the ensuing totalling cycle the box cam 154 will now be rocked counter-clockwise to lower the accumulator into mesh with the lower rack sections 152.

Since the switch 24 is not closed during a totalling operation, the pulse emitter 52 will be ineffective to supply pulses to the various decades of the counter. Consequently, the clutching devices including pawls 116 will remain ineffective. However, the pawls 92 will be effective to yieldably advance the racks until they are arrested by associated accumulator gears when the latter reach zero positions.

Printer

The various values represented by the numerical positioning of the racks 50 during item entering and totalling operations are printed on a paper tape 185 which is fed from a supply roll (not shown) onto a platen 186 which carries the tape to a printing point where the values are printed thereon.

The printer comprises a series of numeral printing dials 187 (see also Fig. 6), each associated with one of the racks 50. Each dial has spaced around its periphery a series of type ranging from "0" to "9," and these dials are so entrained with their racks that they will print digits corresponding to the numerical positions which the racks are moved during their forward strokes.

Each dial 187 is rotatably mounted on a separate lever 188 which is loosely keyed on a printer control shaft 190 and is spring urged clockwise by a spring 191 extending between the arm and a part of the machine frame. A gear 192 fixed to each dial is permanently meshed with a gear 193 also rotatably mounted on the associated printer lever 188. Except during printing operations, the levers 188 are held in their positions illustrated in Fig. 3 wherein each gear 193 meshes with an associated one of a series of idler gears 194 independently and rotatably mounted on a fixed support shaft 195. The latter gears are continuously meshed with rack sections 196 carried by the various racks 50.

After the rack drive shaft has reached its advanced position 51a and before its return, the shaft 190 is rocked clockwise by means not shown permitting springs 191 to rock the arms 188 to effect printing. The shaft is then rocked to return the arms to their initial positions before the shaft 51 is returned.

Referring to Fig. 11, the aforementioned clutch control solenoid 27 has its armature 197 connected to a bell crank 198 pivoted at 199, and the bell crank, in turn, is connected through a link 198a to a clutch control bar 200. A hook 201 urged by the spring 81 connects the bar 200 to a pin 201a carried by the aforementioned clutch control dog 78 so as to effect engagement of the clutch upon energization of the solenoid 27.

*Modified read-out machine*

Figs. 12 and 13 illustrate a modified form of a read-out machine which may be utilized when it is desired solely to print an amount read thereinto from the pulse counter. In this form, the machine is similar to that illustrated in Figs. 3 to 6 and 8 to 11, except that the yieldable drive pawls 92 are effective to initially drive the respective racks 50a during both read-out and totalling operations. Pawls 202 in this case, are independently pivoted on a cross rod 202a suitably supported in the machine frame and are urged upwardly by tension springs 203 extending between the same and a cross rod 203a. A pawling lip 204 on each pawl is adapted to engage one of the series of teeth formed on a bar 205 attached to each rack 50a by rivets 205a. However, each pawl is prevented from normally engaging such bar by a respective latch 206 fulcrumed on a cross rod 207 and urged clockwise to the position shown by a spring 208 extending between the latch and the rod 202a.

The various latches 206 have portions thereof forming armatures co-operable with electromagnets 210 mounted in a channel member 211 secured by screws 212 to the machine side frames.

Each of the electromagnets 210 is connected in series with a respective counter decade through a suitable amplifier in a manner similar to the connections for the aforementioned electromagnets 22, and 47 to 49. Thus, during a read-out operation when a counter decade is filled up, current will be applied to the respective magnet, like magnet 210, to cause the latch 206 to release its pawl 202, whereupon spring 203 will move the same into blocking engagement with the vertical shoulder of the next adjacent tooth on rack bar 205. The printer (not shown) is similar to that shown in Fig. 3 and is connected to the racks 50a in a similar manner. However, as illustrated in Fig. 7, the printer dials 187a have their numeral type arranged therearound in a manner directly opposite to the dials 187. Thus, although the racks 50a are differentially advanced to numerical positions which are representative of values complementary to the values registered by the respective counter decades, the dials 187a will print the true values.

After the printing phase and during the return movement of the racks, the various pawls 202 are returned to their initial latched positions by a series of helically arranged tens transfer cams 213 carried by a shaft 214 and engageable with ears 215 on the pawls.

*Modified read-out system*

Figs. 14 to 20, inclusive, illustrate a modified form of the invention utilizing a visible dial type amount indicating device controlled by a rotary actuator mechanism.

The device generally indicated at 216 comprises a main shaft 217 rotatably journalled in bearings 218 and 219 carried in a frame 220 of the device.

A cyclically operable clutch generally indicated at 221, and similar to clutch 77 of Fig. 11, is adapted to couple the shaft 217 to a gear 222 rotatably mounted on the shaft and attached to the driving side of the clutch. The gear 222 is entrained through a compound idler 223 with a gear 224 driven by a motor 225.

The shaft 217 supports a series of four dial units, each unit embodying a dial 227 having numerals spaced therearound and progressively ranging in value from "0" to "9." A ten-toothed ratchet 228 is integrally attached to each dial. Each dial is connected through a torsion spring 229 to a disc 230 keyed on the shaft 217. The spring is normally effective to hold a pin 550 on the respective dial in engagement with a pin 551 on the associated disc 230 so as to position the dial to present the numeral "0" through an aligned opening or window 231 formed in a frame cover 232 when the shaft 217 is in its illustrated full cycle position.

Each dial unit has associated therewith an arresting pawl 233 pivoted on a support rod 234 which is held in position by a bracket 235. The latter is secured by screws 236 to a channel member 237 forming part of the frame 220 of the indicating device. A blocking nose 233a of each pawl is located in alignment with the associated dial ratchet 228 and each pawl has a spring 239 tensioned between a suitable part of the bracket and a tail formed on the pawl 233 to normally hold the latching nose 233a out of blocking engagement with the ratchet.

Each pawl 233 has an ear 240 thereon forming an armature which co-operates with an electromagnet 242 suitably secured to the channel member 237.

The various electromagnets 241 and 244 for respective ones of the various dial units (see also Fig. 14) are connected through respective ones of a group of lines 245 to respective ones of the counter decades 12a, 13a, 14a, and 15a, in a manner similar to the connections shown in Fig. 1. That is, each magnet, excepting magnet 244, associated with the highermost denomination dial unit is connected to the output circuit of its respective counter decade, like decade 12a, through an amplifier circuit, like 42a, and normally open contacts, like contacts 33a, of a relay 19a.

A pulse emitter, generally indicated at 246 (Figs. 14, 17, and 19) is provided to apply pulses to the input circuit of the various counter decades in time with the incremental rotation of the shaft 217. For this purpose, the pulse emitter comprises a disc 247 having a series of nine lobes 248 spaced around the periphery thereof area. The disc is keyed on the shaft 217 and co-operates with a roller 247a carried by a normally opened switch indicated at 250. The latter switch is in circuit between a source of positive potential 251 and a pulse line 249 common to normally open contacts, like contacts 329, adapted to connect such line with the input circuit, like input circuit 12b, of the associated counter decade.

When it is desired to read out the value registered on the counter decades 12a, etc., a normally opened switch 252 is closed, completing a circuit from the positive potential source 251 through the winding of a relay 253 to ground. Relay contacts are thus closed completing a circuit from source 251, through the winding of relay 19a to energize the latter. The switch 252 is likewise effective to complete a circuit through the motor 225 and a clutch operating solenoid 255 (see also Fig. 18). The armature 256 of the latter is connected through a pin and slot connection 257 to a clutch dog 258 which is fulcrumed on a pivot pin 260 carried by a bracket 261 suitably secured to the frame 220. Upon energization of the solenoid 255, the armature 256 withdraws the clutch dog 258 from engagement with the clutch 221 and against the action of a tension spring 262 to enable engagement of the clutch, thereby driving the shaft 217.

A holding circuit is established to maintain the circuit through the motor 225 for a complete rotation of the shaft 217. For this purpose, a disc 263 (Figs. 14 and 20) is keyed in the shaft 217 and co-operates with a normally open switch generally indicated at 264 connected in circuit across the switch 252. The disc 263 has a depression 265 which, when the machine is in its full cycle position illustrated is aligned with a roller 266 connected to the movable contact of the switch. As soon as the shaft 217 commences rotation, the disc 263 will become effective to hold the switch closed until the shaft has substantially completed a full revolution.

The lobes 248 (Fig. 19) on the disc 247 are so arranged that as the shaft advances through each one-tenth revolution, i. e., between one numerical position and the next a pulse will be transferred from the positive source 251 and through the now closed relay contacts, like 32a, of relay 19a to the input circuits, like circuit 12b, of the various counter decades. When an overcarry occurs in any decade, the resultant pulse transmitted through the output circuit thereof, like circuit 12c, will be amplified and transmitted to the respective electromagnet, like magnet 241, thus causing the latter to rock the respective pawl 233 clockwise against the action of its spring 239 to engage its nose 233a with the next adjacent tooth of the associated dial ratchet 228. The respective dial will therefore indicate, through the window 231, a numeral corresponding to the value previously registered by the associated counter decade.

As the shaft 217 continues through the remainder of its revolution the torsion spring 229 will be placed under tension and the pawl 233 will be latched in blocking position by a respective latch 270. Each of the latter latches is pivoted at 271 on a bracket extending from the channel number 237 and is urged counterclockwise against an accurate surface on the pawl 233 by a tension spring 272 extending between the latch and the pivot rod 234. When the pawl 233 is rocked to blocking position, the latch 270 will be effective to move slightly counterclockwise to engage a notch in the top surface of the pawl.

When it is desired to reset the indicating device to clear to zero condition, a second normally open switch 275 is closed, completing a circuit from the positive potential source 251, through a solenoid 276 (see also Fig. 16) to ground. The armature 277 of the latter is pivotally connected to a bail 278 fulcrumed at 271 and overlying the lower tails of all of the latches 270. The bail 278 is thus rocked clockwise from its position shown in Fig. 16, where it is normally held by a tension spring 269, enabling the same to engage the lower tails of all latches 270, thereby releasing the pawls 233 to the action of their springs 239 to release dials 227. Springs 229 will then become effective to advance the dials to their zero indicating positions wherein the pins 550 on each dial will arrest against the pin 551 on its associated disc 230.

Although we have described our invention in detail and have therefore used certain terms and languages herein, it is to be understood that the present disclosure is illustrative rather than restrictive and that changes and modifications may be made without departing from the spirit or scope of the invention as set forth in the claims appended hereto. For example, the broader aspects of the invention encompass the use of our read-out system in connection with either pulse actuated counters or accumulators and the term "pulse actuated accumulating device" or similar terms found in the appended claims is therefore intended to be generic to either a pulse actuated counter or a pulse actuated accumulator. It is further conceivable that the broader aspects, at least, of the invention could be applied to either relay or mechanical type decades. Also, the invention may be associated with non-relay types of switching devices well-known in its art, such as diode or vacuum tube matrices, in lieu of the certain relays, such as relay 19.

Having thus described the invention, what we desire to secure by United States Letters Patent is:

1. A read-out system for registering amounts accumulated in a multi-decade pulse actuated accumulating device having a pulse input circuit for each decade thereof, said read-out system comprising the combination of a multi-denominational registering mechanism having a registering element in each denomination thereof, differential actuators for incrementally advancing said registering elements, means for driving said actuators, a pulse emitter controlled by said driving means and operable in synchronism therewith, said pulse emitter being effective to emit a pulse during each increment of advance of said actuators, means for selectively connecting said pulse emitter to all of said pulse input circuits, and means responsive to accumulation of predetermined amounts in said decades for controlling respective ones of said actuators.

2. A read-out system for registering amounts accumulated in a multi-decade pulse actuated accumulating device having a pulse input circuit and an output circuit for each decade thereof, each of said output circuits being effective to emit a pulse upon accumulation of a predetermined amount in its respective decade, said read-out system comprising the combination of a multi-denominational registering mechanism having a registering element in each denomination thereof, differential actuators for incrementally advancing said registering elements, means for driving said actuators, a pulse emitter controlled by said driving means and operable in synchronism therewith, said pulse emitter being effective to emit a pulse during each increment of advance of said actuators, means for selectively connecting said pulse emitter to all of said pulse input circuits, and means responsive to emission of pulses from said output circuits for controlling respective ones of said actuators.

3. A read-out system for registering amounts accumulated in a pulse actuated accumulating device having a pulse input circuit and an output circuit effective to emit a pulse upon accumulation of a predetermined amount, said read-out system comprising the combination of a value recording device progressively movable to different value positions to record progressively different values, respectively, means for driving said recording device to progressively decreasing value recording positions thereof, a pulse emitter controlled by said driving means and effective to emit one pulse during movement of said recording device from each of said value positions thereof to the next, means for selectively connecting said pulse emitter to said pulse input circuit, and means controlled by said output circuit upon emission of a pulse therefrom for rendering said driving means ineffective to further drive said recording device.

4. A read-out system for registering amounts accumulated in a pulse actuated accumulating device having a pulse input circuit and a pulse output circuit effective to emit a pulse upon accumulation of a predetermined amount, said read-out system comprising the combination of a value recording device movable to different value positions to record progressively different values, respectively, means for driving said recording device to progressively decreasing value recording positions thereof, means controlled by said driving means for applying a pulse to said pulse input circuit as an incident to movement of said recording device from each of said value positions to the next, and means responsive to emission of a pulse from said output circuit for rendering said driving means ineffective to further drive said recording device.

5. A read-out system for registering amounts accumulated in a pulse actuated accumulating device having a pulse input circuit and a pulse output circuit effective to emit a pulse upon accumulation of a predetermined amount, said read-out system comprising the combination of a numeral recording device movable to different numeral positions to record progressively different values, means for driving said recording device to progressively advancing numeral positions thereof, means normally rendering said driving means ineffective to drive said recording device, means including a pulse emitter effective to apply pulses to said pulse input circuit in synchronism with the movement of said driving means, and means responsive to emission of a pulse from said output circuit for rendering said driving means effective to drive said recording device.

6. A read-out system for registering amounts accumulated in a pulse actuated accumulating device having a pulse input circuit and an output circuit effective to emit a pulse upon accumulation of a predetermined amount, said read-out system comprising the combination of a numeral recording device progressively movable to different numeral positions to record progressively advancing values, respectively, a normally disabled coupling device movable through a predetermined stroke for moving said recording device to progressively advancing value recording positions thereof, means operable in time with said moving means to apply a pulse to said pulse input circuit as an incident to movement of said recording device from each of said value positions thereof to the next, and means responsive to emission of a pulse from said output circuit for rendering said coupling device effective to drive said recording devices through the remainder of said stroke.

7. A read-out system for registering amounts accumulated in a pulse actuated accumulating device having a pulse input circuit and an output circuit effective to emit a pulse upon accumulation of a predetermined amount, said read-out system comprising the combination of a numeral recording device progressively movable to different numeral positions to record progressively different values, respectively, means including a normally disabled coupling device movable through a predetermined stroke for driving said recording device to progressively advancing value recording positions thereof, means responsive to operation of said recording device for applying a pulse to said input circuit in advance of movement of said driving means and for thereafter applying a pulse to said pulse input circuit as an incident to movement of said recording device from each of said value positions thereof to the next, and means responsive to emission of a pulse from said output circuit for rendering said coupling device effective to drive said recording device through the remainder of said stroke.

8. A read-out system for registering amounts accumulated in a multi-decade pulse actuated accumulating device having a pulse input and an output circuit for each decade thereof, said output circuit being effective to emit a pulse upon accumulation of ten pulses in its respective decade, said read-out system comprising the combination of a multi-denominational registering device having a registering element in each denomination thereof, each registering element thereof being progressively movable to different value registering positions to register progressively different values, respectively, means for differentially and independently moving the various registering elements of said registering device, control devices for said last named means, a pulse emitter operable in synchronism with said driving means, and effective to emit a pulse during advancement of said registering elements from one value registering position to the next, means for connecting the pulse input circuit of each of said decades, except the decade of lowermost order, to the output circuit of the preceding lower decade, and means selectively for causing said last mentioned means to disconnect said pulse input circuits from said output circuits and for connecting said output circuits to respective ones of said control devices.

9. A read-out system for registering amounts accumulated in a multi-decade pulse actuated accumulating device having a pulse input and an output circuit for each decade thereof, said output circuit being effective to emit a pulse upon accumulation of ten pulses in its respective decade, said read-out system comprising the combination of a multi-denominational registering device having a registering element in each denomination thereof, each registering element being progressively movable to different value registering positions to register progressively different values, respectively, means including control devices for differentially and independently moving respective ones of the various registering elements of said registering device, said driving means advancing one increment during movement of said registering elements thereby from one of said registering positions to the next, means operable in time with said driving means for applying a pulse to said pulse input circuits during each increment of advancement of said driving means, means for selectively connecting the pulse input circuit of each of said decades, except the decade of lowermost order, to the output circuit of the preceding lower decade, and means for causing said last mentioned means to disconnect said pulse input circuits from said output circuits, and for connecting said output circuits to respective ones of said control devices.

10. A read-out system for registering amounts accumulated in a multi-decade pulse actuated counter having pulse input circuit and an output circuit for each decade thereof, said output circuit being effective to emit a pulse upon accumulation of the amount ten in its respective decade, said read-out system comprising the combination of a multi-denominational numeral recording device having a recording element in each denomination thereof, said recording elements being progressively movable to progressively different value recording positions, means including normally disabled coupling mechanisms movable through predetermined strokes for driving the various recording elements of said recording device to progressively advancing value recording positions thereof, control devices for enabling said coupling mechanisms, a pulse emitting device operable in time with said driving means, means for connecting the pulse input circuit of each of said decades except the decade of lowermost order, to the output circuit of the preceding lower decade, and means for selectively causing said last mentioned means to disconnect said pulse input circuits from said output circuits, for connecting said pulse input circuits to said pulse emitter, and for connecting said output circuits to respective ones of said control devices whereby an output pulse will be effective to cause a respective one of said coupling mechanisms to drive a respective recording element through the remainder of the stroke of said respective coupling mechanism.

11. A read-out system for registering amounts accumulated in a multi-decade pulse actuated counter having a pulse input circuit and an output circuit for each decade thereof, said output circuit being effective to emit a pulse upon accumulation of ten pulses in its respective decade, said read-out system comprising the combination of a multi-denominational numeral recording device having a recording element in each denomination thereof, said recording element being progressively movable to different value recording positions to record progressively different values, respectively, means including normally disabled coupling mechanisms for driving the various recording elements of said recording device, control devices for said coupling mechanisms, said driving means advancing one increment during movement of said recording elements thereby from one of said recording positions thereof to the next, means operable in time with said driving means for emitting a pulse during each increment of advancement of said driving means, means for connecting the pulse input circuit of each of said decades, except the decade of lowermost order, to the output circuit of the preceding lower decade, and means for selectively causing said last mentioned means to disconnect said pulse input circuits from said output circuits, for connecting said pulse input circuits to said pulse emitting means, and for connecting said output circuits to respective ones of said control devices.

12. A read-out system for registering amounts accumulated in a multi-decade pulse actuated counter having a pulse input and an output circuit for each decade thereof, said output circuit being effective to emit a pulse upon accumulation of the amount ten in its respective decade, said read-out system comprising the combination of a multi-denominational registering device having a registering element in each denomination thereof, said registering elements being progressively movable to progressively advancing value registering positions, means for differentially and independently driving the various registering elements denominationally arranged control devices for said last named means, a pulse emitter operable by said driving means, means for connecting the pulse input circuit of each of said decades, except the decade of lowermost order, to the output circuit of the preceding lower decade, and means for selectively causing said last mentioned means to disconnect said pulse input circuits from said output circuits, for connecting said pulse input circuits to said pulse emitter, and for connecting said output circuits to respective ones of said control devices.

13. A read-out system for registering amounts accumulated in a multi-decade pulse actuated counter having a pulse input and an output circuit for each decade thereof, said output circuit being effective to emit a pulse upon accumulation of the amount ten in its respective decade, said read-out system comprising the combination of a recording device including a plurality of denominationally arranged recording elements, each of said elements being progressively movable to progressively different recording positions, differential actuators for said recording elements, means including normally disabled coupling mechanisms movable through predetermined strokes for driving said actuators, electromagnetic devices for enabling said coupling mechanisms, a pulse emitter operable by said driving means, means normally connecting the pulse input circuit of each of said decades, except the decade of lowermost order, to the output circuit of the preceding lower decade, means for initiating operation of said recording device, and means controlled by said initiating means for connecting said output circuits to respective ones of said electromagnetic devices.

14. A read-out system for a multi-decade counter having an input circuit and an output circuit for each decade thereof, said read-out system comprising the combination of means for applying ten impulses to said input circuits, a multi-denominational read-out device operable to register amounts according to the complements of amounts entered thereinto, control devices for the various denominations of said read-out device, and means for operatively connecting said output circuits to respective ones of said control devices.

15. A read-out system for a multi-decade counter, each decade having N stable counting states, said read-out system comprising the combination of means for applying a number of impulses to each of said counter decades equal to N, a multi-denominational read-out device having a registering element in each denomination thereof, said registering element being adapted to progressively advance to register amounts of progressively varying values, actuating devices for advancing respective ones of said registering elements in synchronism with said first mentioned means, control devices for respective ones of said registering elements, and means controlled by each of said decades upon registering a total of N stable counting states for actuating respective ones of said control devices.

16. A read-out system for a multi-decade counter having an output circuit for each decade thereof and an input circuit, said read-out system comprising the combination of means for applying ten impulses to said input circuits, a multi-denominational read-out device having a registering element in each denomination thereof, said registering elements being adapted to progressively advance to register amounts of progressively varying values, means for advancing said registering elements in synchronism with said first mentioned means, control devices for respective ones of said registering elements, and means for operatively connecting said output circuits to respective ones of said control devices.

References Cited in the file of this patent

UNITED STATES PATENTS

| | | |
|---|---|---|
| 597,973 | Green | Jan. 25, 1898 |
| 1,916,987 | Peirce | July 4, 1933 |
| 2,239,524 | Johnstone et al. | Apr. 22, 1941 |
| 2,403,873 | Mumma | July 9, 1946 |
| 2,592,436 | Lambert | Apr. 8, 1952 |
| 2,669,388 | Fox | Feb. 16, 1954 |